(12) United States Patent
Oh et al.

(10) Patent No.: US 12,547,880 B2
(45) Date of Patent: Feb. 10, 2026

(54) SPIKE NEURAL NETWORK CIRCUIT INCLUDING PROBABILISTIC OPERATOR

(71) Applicant: Electronics and Telecommunications Research Institute, Daejeon (KR)

(72) Inventors: Kwang Il Oh, Daejeon (KR); Jae-Jin Lee, Daejeon (KR); Tae Wook Kang, Daejeon (KR); Hyuk Kim, Daejeon (KR); In San Jeon, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 642 days.

(21) Appl. No.: 17/990,167

(22) Filed: Nov. 18, 2022

(65) Prior Publication Data

US 2023/0259745 A1 Aug. 17, 2023

(30) Foreign Application Priority Data

Feb. 16, 2022 (KR) .......................... 10-2022-0019904

(51) Int. Cl.
*G06N 3/063* (2023.01)
*G06F 7/58* (2006.01)
*G06N 3/045* (2023.01)
*G06N 3/047* (2023.01)
*G06N 3/049* (2023.01)
*G06N 3/08* (2023.01)

(52) U.S. Cl.
CPC .............. *G06N 3/049* (2013.01); *G06F 7/58* (2013.01); *G06N 3/047* (2023.01); *G06N 3/063* (2013.01)

(58) Field of Classification Search
CPC ........ G06N 3/049; G06N 3/047; G06N 3/063; G06F 7/58; G06F 7/588
See application file for complete search history.

(56) References Cited

U.S. PATENT DOCUMENTS 9,053,428 B2    6/2015  Hunzinger et al.
2012/0259804 A1* 10/2012  Brezzo .................. G06N 3/063
                                            706/33

(Continued)

FOREIGN PATENT DOCUMENTS

KR       10-1512370       4/2015
KR       10-1596656       2/2016

(Continued)

*Primary Examiner* — Brandon S Cole
(74) *Attorney, Agent, or Firm* — KILE PARK REED & HOUTTEMAN PLLC

(57) ABSTRACT

Disclosed is a spike neural network circuit including an axon circuit that generates a first input spike signal, a conversion table that converts a first fire probability of a first neuron corresponding to the first input spike signal into a first threshold value, and a probabilistic operator. The probabilistic operator includes a random number generator that generates a random number value based on an event that the first input spike signal is at a first logic level, a random number comparator that generates a first comparison signal by comparing the first threshold value with the random number value, and a spike generator that generates an output spike signal corresponding to the first neuron based on an event that the first comparison signal is at the first logic level.

13 Claims, 9 Drawing Sheets

(56) References Cited

U.S. PATENT DOCUMENTS

| | | | |
|---|---|---|---|
| 2013/0073497 A1* | 3/2013 | Akopyan | G06N 3/063 |
| | | | 706/27 |
| 2015/0039546 A1 | 2/2015 | Alvarez-Icaza et al. | |
| 2015/0106316 A1* | 4/2015 | Birdwell | G06N 3/086 |
| | | | 706/33 |
| 2015/0286924 A1* | 10/2015 | Arthur | G06N 7/01 |
| | | | 706/25 |
| 2015/0379398 A1* | 12/2015 | Arthur | G06F 7/582 |
| | | | 706/25 |
| 2017/0116513 A1* | 4/2017 | Andreopoulos | G06N 3/0442 |
| 2018/0174039 A1 | 6/2018 | Davies | |
| 2018/0197076 A1 | 7/2018 | Paik et al. | |
| 2018/0225564 A1* | 8/2018 | Haiut | G06F 7/58 |
| 2019/0213472 A1 | 7/2019 | Park et al. | |
| 2020/0074272 A1 | 3/2020 | Okazawa et al. | |

FOREIGN PATENT DOCUMENTS

| | | |
|---|---|---|
| KR | 10-2018-0077533 | 7/2018 |
| KR | 10-2019-0051766 | 5/2019 |

\* cited by examiner

Case 1) in case that fire probability is 19%

Case 2) in case that fire probability is 82.5%

SPIKE NEURAL NETWORK CIRCUIT INCLUDING PROBABILISTIC OPERATOR

CROSS-REFERENCE TO RELATED APPLICATIONS

This application claims priority under 35 U.S.C. § 119 to Korean Patent Application No. 10-2022-0019904 filed on Feb. 16, 2022, in the Korean Intellectual Property Office, the disclosures of which are incorporated by reference herein in their entireties.

BACKGROUND

Embodiments of the present disclosure described herein relate to a spike neural network circuit, and more particularly, relate to a spike neural network circuit including a probabilistic operator.

An artificial neural network (ANN) may process data or information in a method similar to a method of a biological neural network. Unlike a perceptron-based neural network or a convolution-based neural network, in a spike neural network, a spike signal including a pulse toggling during a short time may be delivered instead of a signal of a specific level.

As a general spike neural network performs a multiplication operation of a weight stored in a synapse and an accumulation operation of a charge in a neuron when an input spike is applied, the general spike neural network may generate an output spike. The general spike neural network performs both the multiplication operation and the accumulation operation to generate the output spike, and thus an operation procedure of a spike neural network may be complicated. Accordingly, there is a need for a spike neural network circuit that simplifies the operation procedure of the spike neural network.

SUMMARY

Embodiments of the present disclosure provide a spike neural network circuit including a probabilistic operator.

According to an embodiment, a spike neural network circuit includes an axon circuit that generates a first input spike signal, a conversion table that converts a first fire probability of a first neuron corresponding to the first input spike signal into a first threshold value, and a probabilistic operator. The probabilistic operator includes a random number generator that generates a random number value based on an event that the first input spike signal is at a first logic level, a random number comparator that generates a first comparison signal by comparing the first threshold value with the random number value, and a spike generator that generates an output spike signal corresponding to the first neuron based on an event that the first comparison signal is at the first logic level. The first fire probability is identical to a probability that the random number value is greater than or equal to the first threshold value.

In an embodiment, the probabilistic operator further includes a spike detector that generates a first activation signal having the first logic level when the first input spike signal is received from the axon circuit and generates the first activation signal having a second logic level when the first input spike signal is not received from the axon circuit.

In an embodiment, the random number comparator generates the first comparison signal by comparing the first threshold value with the random number value when the first activation signal is at the first logic level and does not generate the first comparison signal when the first activation signal is at the second logic level.

In an embodiment, the axon circuit is further configured to generate a second input spike signal. The conversion table is further configured to convert a second fire probability of a second neuron corresponding to the second input spike signal into a second threshold value. The random number generator is further configured to generate the random number value based on an event that at least one of the first input spike signal and the second input spike signal is at the first logic level. The spike detector is further configured to generate a second activation signal having the first logic level when the second input spike signal is received and to generate the second activation signal having the second logic level when the second input spike signal is not received. The random number comparator is further configured to generate a second comparison signal by comparing the second threshold value with the random number value. The spike generator is further configured to generate the output spike signal based on an event that at least one of the first comparison signal and the second comparison signal is at the first logic level. The second fire probability is identical to a probability that the random number value is greater than or equal to the second threshold value.

In an embodiment, the spike neural network circuit further includes a first logic gate that generates a random number generator activation signal corresponding to an OR operation of the first activation signal and the second activation signal and a second logic gate that generates a spike generator activation signal corresponding to an OR operation of the first comparison signal and the second comparison signal.

In an embodiment, the random number generator is further configured to generate the random number value when the random number generator activation signal is at the first logic level. The spike generator is further configured to generate the output spike signal when the spike generator activation signal is at the first logic level. The first logic level is at a logic high level.

In an embodiment, the random number comparator is further configured to generate the first comparison signal having the first logic level when the random number value is greater than or equal to the first threshold value and to generate the first comparison signal having a second logic level when the random number value is less than the first threshold value. The first logic level is at a logic high level, and the second logic level is at a logic low level.

In an embodiment, the conversion table is further configured to convert a first weight value learned for a first synapse corresponding to the first input spike signal and the first neuron into the first fire probability. The first fire probability is a probability that the first neuron fires.

In an embodiment, the random number generator is further configured to output one value of a lower limit value, an upper limit value, and values between the lower limit value and the upper limit value as the random number value. Probabilities that each of the lower limit value, the upper limit value, and the values between the lower limit value and the upper limit value is output as the random number value are the same as each other.

According to an embodiment, a spike neural network circuit includes an axon circuit that generates a first input spike signal, a conversion table that converts a first fire probability of a first neuron corresponding to the first input spike signal into a first threshold value and converts a second fire probability of a second neuron corresponding to the first input spike signal into a second threshold value, a first probabilistic operator, and a second probabilistic operator. The first probabilistic operator includes a first random number generator that generates a first random number value based on an event that the first input spike signal is at a first logic level, a first random number comparator that generates a first comparison signal by comparing the first threshold value with the first random number value, and a first spike generator that generates a first output spike signal corresponding to the first neuron based on an event that the first comparison signal is at the first logic level. The second probabilistic operator includes a second random number generator that generates a second random number value based on an event that the first input spike signal is at the first logic level, a second random number comparator that generates a second comparison signal by comparing the second threshold value with the second random number value, and a second spike generator that generates a second output spike signal corresponding to the second neuron based on an event that the second comparison signal is at the first logic level. The first fire probability is identical to a probability that the first random number value is greater than or equal to the first threshold value. The second fire probability is identical to a probability that the second random number value is greater than or equal to the second threshold value.

In an embodiment, the first probabilistic operator further includes a first spike detector that generates a first activation signal having the first logic level when the first input spike signal is received from the axon circuit, and generates the first activation signal having a second logic level when the first input spike signal is not received from the axon circuit. The second probabilistic operator further includes a second spike detector that generates a second activation signal having the first logic level when the first input spike signal is received from the axon circuit, and generates the second activation signal having the second logic level when the first input spike signal is not received from the axon circuit.

In an embodiment, the first random number comparator is further configured to generate the first comparison signal having the first logic level when the first random number value is greater than or equal to the first threshold value and to generate the first comparison signal having a second logic level when the first random number value is less than the first threshold value. The second random number comparator is further configured to generate the second comparison signal having the first logic level when the second random number value is greater than or equal to the second threshold value and to generate the second comparison signal having the second logic level when the second random number value is less than the second threshold value. The first logic level is at a logic high level, and the second logic level is at a logic low level.

In an embodiment, the conversion table is further configured to convert a first weight value learned for a first synapse corresponding to the first input spike signal and the first neuron into the first fire probability and to convert a second weight value learned for a second synapse corresponding to the first input spike signal and the second neuron into the second fire probability. The first fire probability is a probability that the first neuron fires. The second fire probability is a probability that the second neuron fires.

BRIEF DESCRIPTION OF THE FIGURES

The above and other objects and features of the present disclosure will become apparent by describing in detail embodiments thereof with reference to the accompanying drawings.

DETAILED DESCRIPTION

Below, embodiments of the present disclosure will be described in detail and clearly to such an extent that an ordinary one in the art easily implements the present disclosure.

Figure 1:
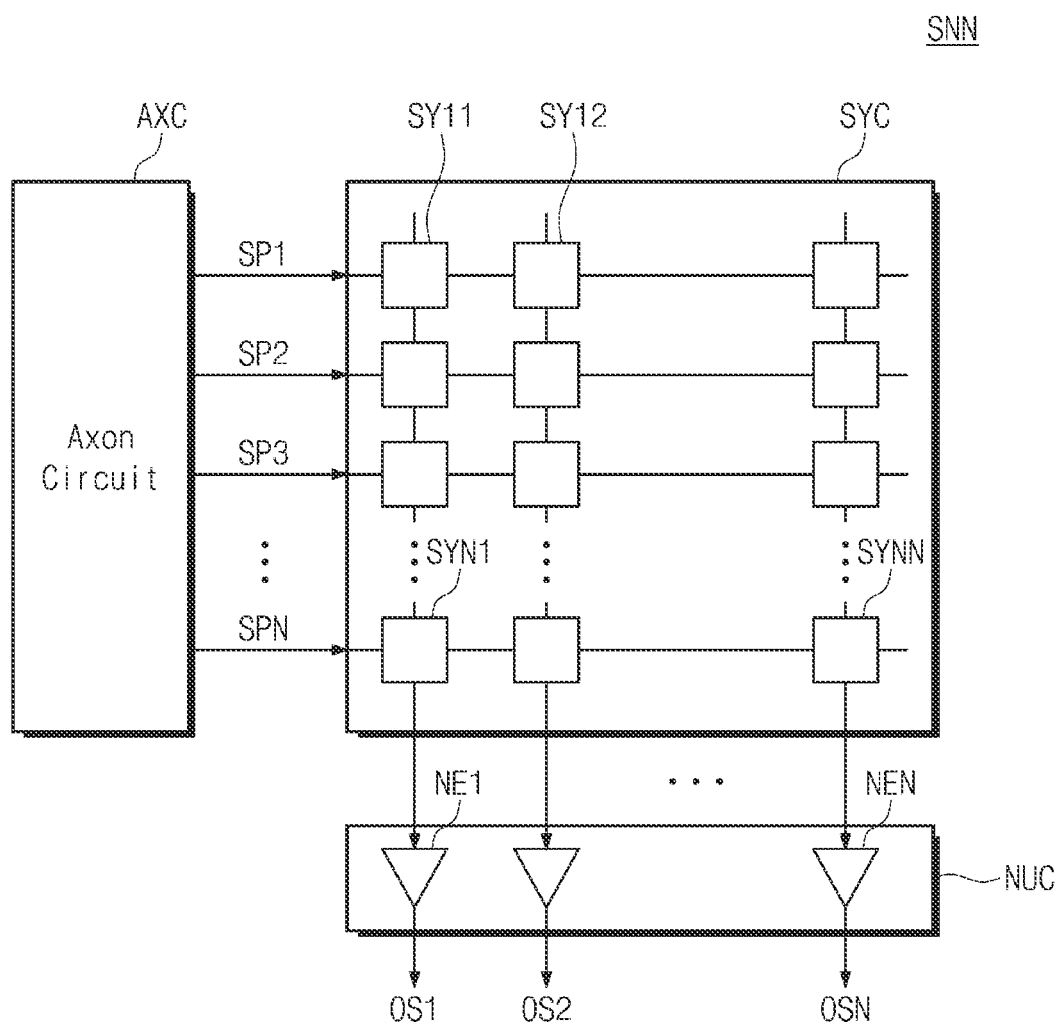
FIG. 1 is a block diagram showing a general spike neural network circuit, according to an embodiment.

FIG. 1 is a block diagram showing a spike neural network circuit, according to an embodiment. Referring to FIG. 1, a spike neural network circuit SNN may include an axon circuit AXC, a synaptic circuit SYC, and a neuron circuit NUC.

The axon circuit AXC may include axons that generate first to N-th input spike signals SP1 to SPN. Similarly to an axon of a biological neural network, an axon of the axon circuit AXC may output a signal to another neuron. 'N' is a natural number.

For example, axons of the axon circuit AXC may generate the corresponding first to N-th input spike signals SP1 to SPN based on data or information input from the outside to the spike neural network circuit SNN, respectively. Each of the first to N-th input spike signals SP1 to SPN may be a pulse signal that toggles during a short time. The axon circuit AXC may output the first to N-th input spike signals SP1 to SPN to the synaptic circuit SYC.

The synaptic circuit SYC may connect the axon circuit AXC to the neuron circuit NUC. The synaptic circuit SYC may include a plurality of synapses SY11 to SYNN that determine whether axons of the axon circuit AXC are connected to the neurons of the neuron circuit NUC, and the strength of the connection. Each of the plurality of synapses SY11 to SYNN may have a unique weight value.

Referring to FIG. 1, it is illustrated that the plurality of synapses SY11 to SYNN are positioned on a two-dimensional array. The first to N-th input spike signals SP1 to SPN may be transmitted in a first direction from the axon circuit AXC to the synaptic circuit SYC. Operation signals (i.e., an operation result) obtained by applying weight values to the first to N-th input spike signals SP1 to SPN may be transmitted in a second direction from the synaptic circuit SYC to the neuron circuit NUC. For example, the first direction and the second direction may be perpendicular to each other.

The plurality of synapses SY11 to SYNN may receive the corresponding first to N-th input spike signals SP1 to SPN. For example, the first synapse SY11 and the second synapse SY12 that are located in a first row among the plurality of synapses SY11 to SYNN may receive the first input spike signal SP1. The N-th synapse SYN1 located in an N-th row among the plurality of synapses SY11 to SYNN may receive the N-th input spike signal SPN.

Each of the plurality of synapses SY11 to SYNN may perform a multiplication operation by applying weight values to the first to N-th input spike signals SP1 to SPN. The weight values may be numerical values indicating a correlation between an axon and a neuron, the strength of connections between axons of the axon circuit AXC and neurons of the neuron circuit NUC, and a correlation between a neuron of the neuron circuit NUC and the input spike signal, as described above.

For example, the first synapse SY11 may apply a first weight value to the first input spike signal SP1. The second synapse SY12 may apply a second weight value to the first input spike signal SP1. The N-th synapse SYN1 may apply an N-th weight value to the N-th input spike signal SPN. Each of the plurality of synapses SY11 to SYNN may generate an operation signal based on an input spike signal and a weight value and then may output the operation signal to the neuron circuit NUC.

First to N-th neurons NE1 to NEN of the neuron circuit NUC may receive operation signals obtained by applying weight values to input spike signals in the synaptic circuit SYC, respectively. Similarly to dendrites in a biological neural network, each of the first to N-th neurons NE1 to NEN may receive a signal output from another neuron.

Referring to FIG. 1, each of the first to N-th neurons NE1 to NEN may be connected to the plurality of synapses SY11 to SYNN arranged in the second direction and may receive operation signals output from the plurality of synapses SY11 to SYNN. The operation signals of the plurality of synapses SY11 to SYNN arranged in the second direction may be accumulated in each of the first to N-th neurons NE1 to NEN. However, the number and arrangement of the plurality of synapses SY11 to SYNN connected to the first to N-th neurons NE1 to NEN are not limited to those illustrated in FIG. 1.

Each of the first to N-th neurons NE1 to NEN may accumulate the operation signals of the plurality of synapses SY11 to SYNN through an accumulation operation. Each of the first to N-th neurons NE1 to NEN may compare the accumulated sum signal with a threshold signal (i.e., a reference signal). When the sum signal is greater than the threshold signal, the first to N-th neurons NE1 to NEN may generate output spike signals OS1 to OSM, respectively.

Figure 2:
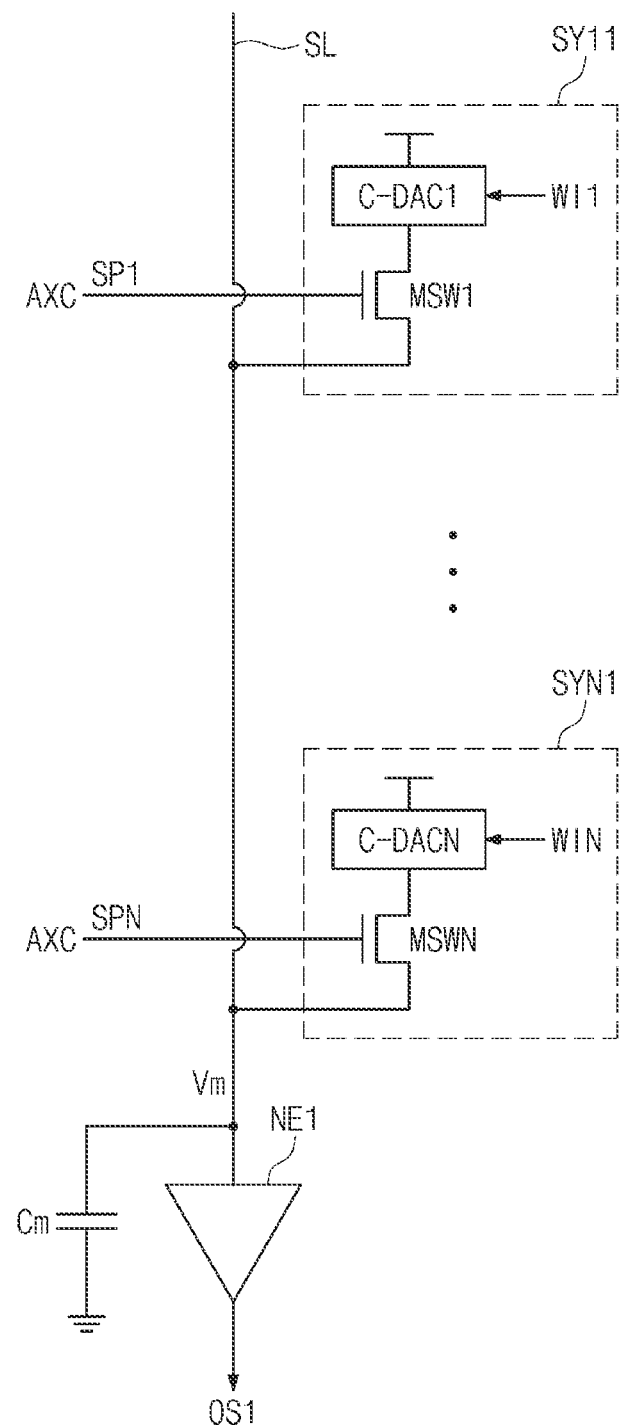
FIG. 2 is a block diagram illustrating synapses of the synaptic circuit of FIG. 1 and a neuron of the neuron circuit in detail.

FIG. 2 is a block diagram illustrating synapses of the synaptic circuit of FIG. 1 and a neuron of the neuron circuit in detail. Referring to FIG. 2, the synapses SY11 to SYN1 and the first neuron NE1 located in a first column of the synaptic circuit SYC of FIG. 1 are shown.

The first synapse SY11 may include a first converter C-DAC1 and a first synapse transistor MSW1. The first synapse SY11 may generate a first operation signal based on the first input spike signal SP1 and a first weight value WI1. The magnitude of the first operation signal may be determined by the product of the first input spike signal SP1 and the first weight value WI1. The first synapse SY11 may output a first operation signal to a transmission line SL.

The N-th synapse SYN1 may be implemented in the same method as the first synapse SY11. The N-th synapse SYN1 may include an N-th converter C-DACN and an N-th synapse transistor MSWN. The N-th synapse SYN1 may generate a second operation signal based on a weight value WIN of the N-th synapse SYN1 and the N-th input spike signal SPN. The N-th synapse SYN1 may output the second operation signal to the transmission line SL.

A capacitor Cm may accumulate charges by the first operation signal output from the first synapse SY11 and the second operation signal output from the N-th synapse SYN1. The capacitor Cm may be charged by currents, which are output from the first to N-th synapses SY11 to SYN1 and which correspond to the first to N-th weight values WI1 to WIN. A voltage Vm of the capacitor Cm may be a value obtained by accumulating the currents output from the first to N-th synapses SY11 to SYN1. The voltage Vm of the capacitor Cm may be a value determined by the first to N-th weight values WI1 to WIN output from the first to N-th synapses SY11 to SYN1. The voltage Vm of the capacitor Cm may be provided by the first neuron NE1.

The first neuron NE1 may compare the voltage Vm of the capacitor Cm with a voltage of a threshold signal. The first neuron NE1 may generate the output spike signal OS1 based on the comparison result. In an embodiment, when the voltage Vm of the capacitor Cm is greater than the voltage of the threshold signal, the first neuron NE1 may output the first output spike signal OS1.

As described above, the first output spike signal OS1 may be generated by performing a multiplication operation in each of the first to N-th synapses and performing an accumulation operation in the first neuron NE1. That is, the operation procedure required to output the first output spike signal OS1 may be complicated. Accordingly, power consumption may increase and operation speed may increase.

Figure 3:
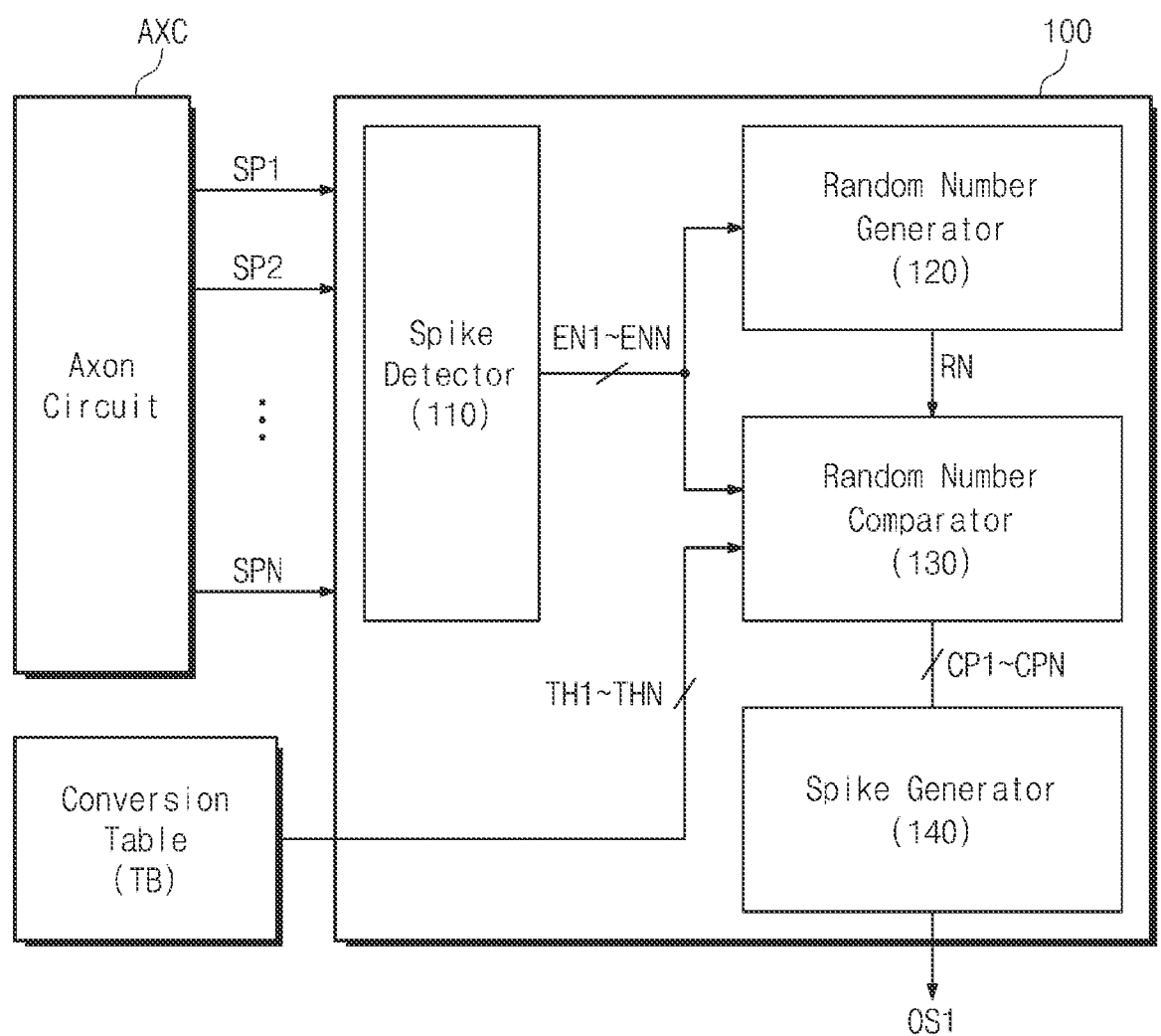
FIG. 3 is a detailed diagram of a spike neural network circuit, according to an embodiment of the present disclosure.

FIG. 3 is a detailed diagram of a spike neural network circuit, according to an embodiment of the present disclosure. Referring to FIG. 3, a spike neural network circuit 10 may include the axon circuit AXC, a conversion table TB, and a probabilistic operator 100.

The axon circuit AXC may include axons that generate input spike signals. Similarly to an axon of a biological neural network, an axon of the axon circuit AXC may output a signal to another neuron.

For example, axons of the axon circuit AXC may generate the corresponding first to N-th input spike signals SP1 to SPN based on data or information input from the outside to the spike neural network circuit 10, respectively. Each of the first to N-th input spike signals SP1 to SPN may be a pulse signal that toggles during a short time. The axon circuit AXC may generate the first to N-th input spike signals SP1 to SPN and may output the first to N-th input spike signals SP1 to SPN to the probabilistic operator 100.

The conversion table TB may output first to N-th threshold values TH1 to THN to the probabilistic operator 100. The first to N-th threshold values TH1 to THN may be values compared with a random number value RN to output the output spike signal OS1. For example, when the random number value RN is greater than or equal to at least one of the first to N-th threshold values TH1 to THN, the probabilistic operator 100 may output the output spike signal OS1. The conversion table TB may convert the first to N-th weight values WI1 to WIN corresponding to the first to N-th synapses SY11 to SYN1 of FIG. 2 into the first to N-th threshold values TH1 to THN.

The first to N-th weight values WI1 to WIN may be the sensitivity of a first neuron corresponding to the first to N-th input spike signals SP1 to SPN, respectively. In other words, when the first weight value WI1 is great, the probability that the first neuron is fired to output the output spike signal OS1 may be high. When the first weight value WI1 is small, the probability that the first neuron is fired to output the output spike signal OS1 may be low. Accordingly, the conversion table TB may convert the first to N-th weight values WI1 to WIN into first to N-th fire probabilities. For example, when the first weight value WI1 is '2', the first fire probability may be 1%. When the N-th weight value WIN is '5', the N-th fire probability may be 2.5%. This will be described in more detail with reference to FIG. 5.

Each of the first to N-th fire probabilities may be the same as the probability that a random number value is greater than each of the first to N-th threshold values. For example, when the first fire probability is '1%', the probability that the random number value is greater than the first threshold value may be '1%'. This will be described in more detail with reference to FIG. 5.

When the first to N-th input spike signals SP1 to SPN are received from the axon circuit AXC, the probabilistic operator 100 may output the output spike signal OS1 corresponding to the first neuron by comparing the random number value RN with each of the first to N-th threshold values TH1 to THN.

The probabilistic operator 100 may output the output spike signal OS1 based on the comparison operation, thereby simplifying the operation procedure as compared to a general synaptic circuit that performs a conventional multiplication operation and accumulation operation. Accordingly, the power consumption of the spike neural network circuit 10 may be reduced, and the operation speed may be improved.

The probabilistic operator 100 may include a spike detector 110, a random number generator 120, a random number comparator 130, and a spike generator 140.

When the first to N-th input spike signals SP1 to SPN are received from the axon circuit AXC, the spike detector 110 may output first to N-th activation signals EN1 to ENN. The first to N-th activation signals EN1 to ENN may turn on the random number generator 120 and the random number comparator 130. In an embodiment, when at least one of the first to N-th activation signals EN1 to ENN is at the first logic level, the random number generator 120 may be turned on. For example, the first logic level may be a logic high level. This will be described in more detail with reference to FIG. 4.

The random number generator 120 may generate the random number value RN based on an event that at least one of the first to N-th activation signals EN1 to ENN is at the first logic level. The random number generator 120 may output one of a lower limit value, an upper limit value, and values between the lower limit value and the upper limit value as the random number value RN. The lower limit value may be the minimum value of the random number value RN. The upper limit value may be the maximum value of the random number value RN. For example, when the lower limit value is '0' and the upper limit value is '200', the random number generator 120 may output '100', which is one of values between '0' and '200', as the random number value RN. The lower limit value and the upper limit value may be arbitrarily defined depending on a user's convenience.

Besides, probabilities that each of the lower limit value, the upper limit value, and the values between the lower limit value and the upper limit value is output as the random number value RN may be the same as one another. For example, when the lower limit value is '0' and the upper limit value is '200', the probability that '20' is to be output as the random number value RN may be the same as the probability that '50' is output as the random number value RN.

The random number comparator 130 may generate first to N-th comparison signals CP1 to CPN by comparing the random number value RN with the first to N-th threshold values TH1 to THN, respectively. In an embodiment, when the random number value RN is greater than the first threshold value TH1, the random number comparator 130 may output the first comparison signal CP1 having the first logic level. However, the present disclosure is not limited thereto. For example, when the random number value RN is less than the first threshold value TH1, the random number comparator 130 may output the first comparison signal CP1 having the first logic level.

The spike generator 140 may generate the output spike signal OS1 based on the first to N-th comparison signals CP1 to CPN. In an embodiment, when at least one of the first to N-th comparison signals CP1 to CPN is at the first logic level, the spike generator 140 may generate the output spike signal OS1.

Figure 4:
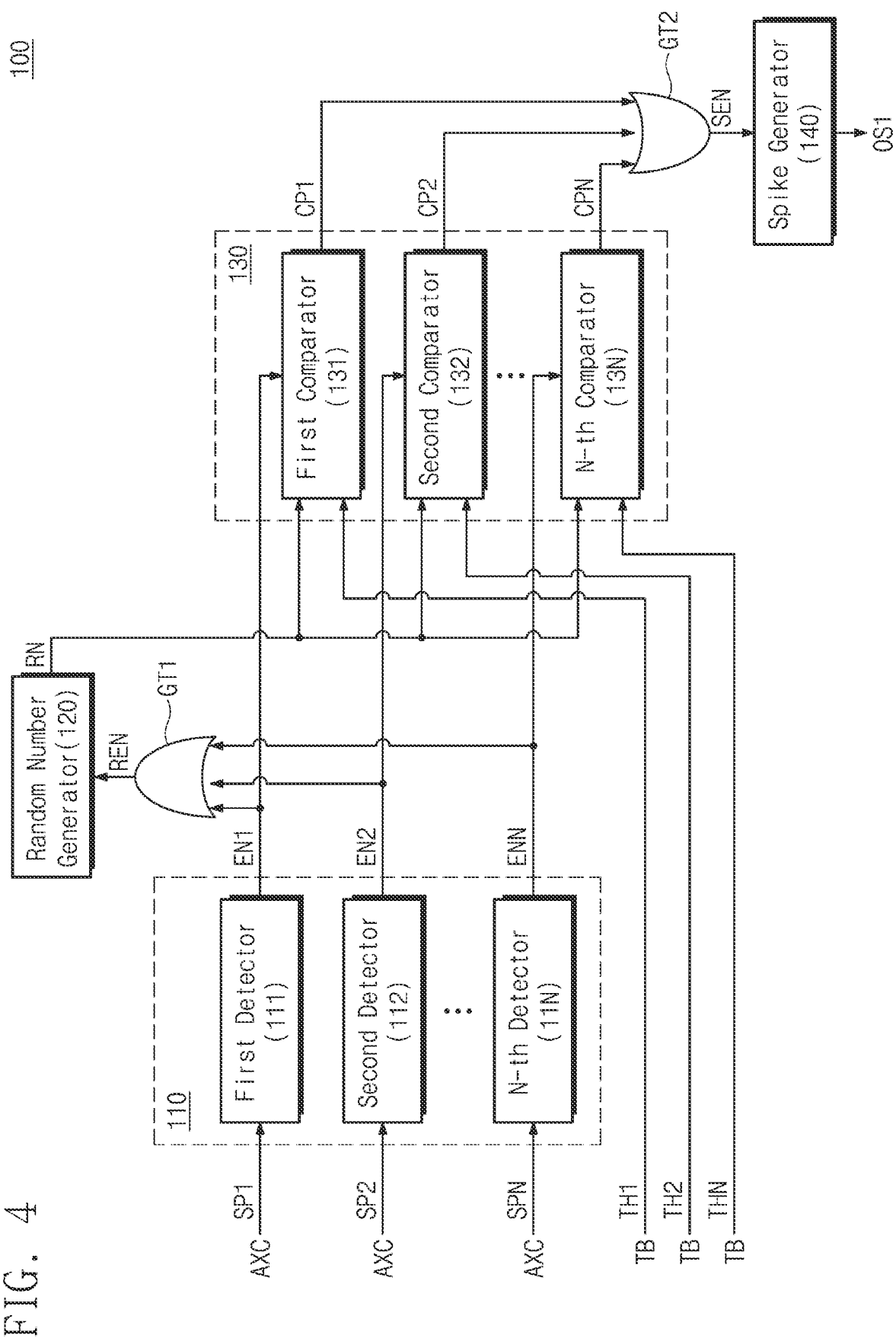
FIG. 4 is a detailed diagram of the probabilistic operator of FIG. 3, according to an embodiment of the present disclosure.

FIG. 4 is a detailed diagram of the probabilistic operator of FIG. 3, according to an embodiment of the present disclosure. Referring to FIG. 4, the probabilistic operator 100 may include the spike detector 110, the random number generator 120, the random number comparator 130, the spike generator 140, a first logic gate GT1, and a second logic gate GT2.

The spike detector 110 may include first to N-th detectors 111 to 11N. The first to N-th detectors 111 to 11N may generate the first to N-th activation signals EN1 to ENN based on receiving the first to N-th input spike signals SP1 to SPN, respectively.

In an embodiment, when receiving the first input spike signal SP1, the first detector 111 may generate the first activation signal EN1 having a logic high level. In an embodiment, when receiving the second input spike signal SP2, the second detector 112 may generate the second activation signal EN2 having a logic high level. When receiving the N-th input spike signal SPN, the N-th detector 11N may generate the N-th activation signal ENN having a logic high level.

In an embodiment, when not receiving the first input spike signal SP1, the first detector 111 may generate the first activation signal EN1 having a logic low level. In an embodiment, when not receiving the second input spike signal SP2, the second detector 112 may generate the second activation signal EN2 having a logic low level. When not receiving the N-th input spike signal SPN, the N-th detector 11N may generate the N-th activation signal ENN having a logic low level.

The first logic gate GT1 may generate a random number generator activation signal REN based on the first to N-th activation signals EN1 to ENN. The first logic gate GT1 may perform an OR operation. In an embodiment, the first logic gate GT1 may generate the random number generator activation signal REN having a logic high level based on an event that at least one of the first to N-th activation signals EN1 to ENN has a logic high level.

When receiving the random number generator activation signal REN having a logic high level, the random number generator 120 may generate the random number value RN. The conversion table TB may output the first to N-th threshold values TH1 to THN. The conversion table TB may include the first to N-th threshold values TH1 to THN respectively corresponding to weight values of a general spike neural network circuit.

The random number comparator 130 may include first to N-th comparators 131 to 13N. The first to N-th comparators 131 to 13N may compare the random number value RN and the first to N-th threshold values TH1 to THN, respectively.

In an embodiment, when the random number value RN is greater than the first threshold value TH1, the first comparator 131 may generate the first comparison signal CP1 having a logic high level. When the random number value RN is greater than the second threshold value TH2, the second comparator 132 may generate the second comparison signal CP2 having a logic high level. When the random number value RN is greater than the N-th threshold value THN, the N-th comparator 13N may generate the N-th comparison signal CPN having a logic high level.

In an embodiment, when the random number value RN is less than the first threshold value TH1, the first comparator 131 may generate the first comparison signal CP1 having a logic low level. When the random number value RN is less than the second threshold value TH2, the second comparator 132 may generate the second comparison signal CP2 having a logic low level. When the random number value RN is less than the N-th threshold value THN, the N-th comparator 13N may generate the N-th comparison signal CPN having a logic low level.

The second logic gate GT2 may generate a spike generator activation signal SEN based on the first to N-th comparison signals CP1 to CPN. The second logic gate GT2 may perform an OR operation. In an embodiment, the second logic gate GT2 may generate the spike generator activation signal SEN having a logic high level based on an event that at least one of the first to N-th comparison signals CP1 to CPN has a logic high level.

When receiving the spike generator activation signal SEN having a logic high level, the spike generator 140 may output the output spike signal OS1.

Figure 5:
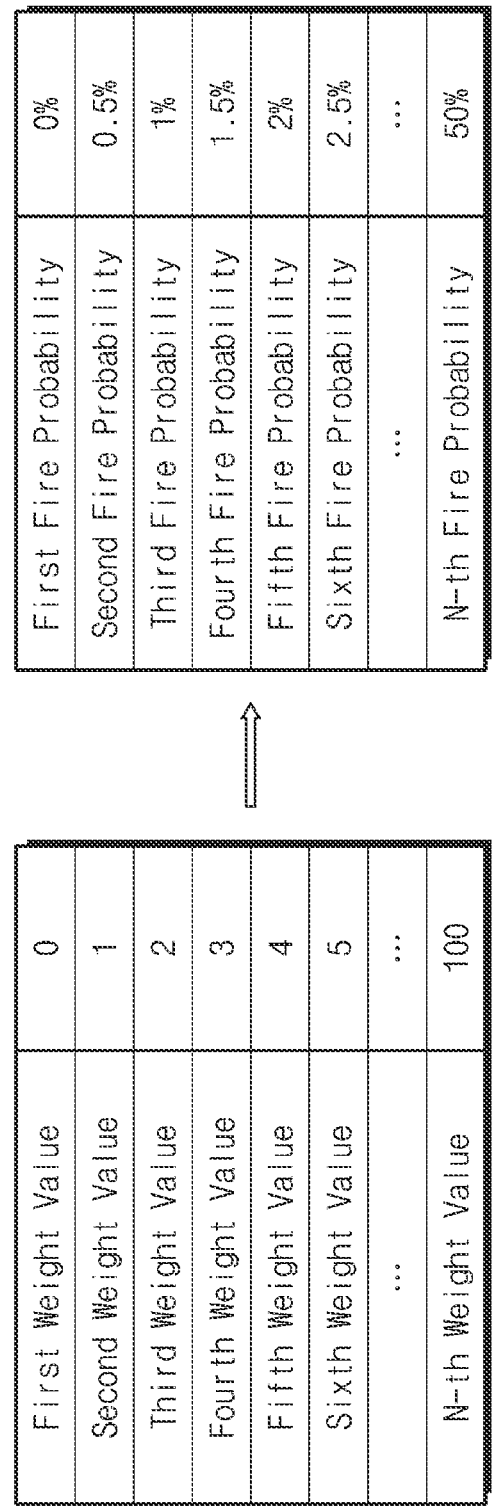
FIG. 5 is a detailed diagram of a conversion table, according to an embodiment of the present disclosure.

FIG. 5 is a detailed diagram of an operation of a conversion table, according to an embodiment of the present disclosure. Referring to FIG. 5, the conversion table may convert first to N-th weight values into first to N-th fire probabilities corresponding to the first to N-th weight values, respectively.

In an embodiment, the conversion table may store a plurality of fire probabilities respectively corresponding to a plurality of weight values. For example, when a plurality of weight values have values between '0' and '100' and a plurality of fire probabilities have a value between '0%' and '50%', as shown in FIG. 5, a fire probability corresponding to the weight value having '0' may be '0%', a fire probability corresponding to the weight value having '1' may be '0.5%', and a fire probability corresponding to the weight value with '100' may be '50%'. As described above, it is described with reference to FIG. 5 that the plurality of weight values have values between '0' and '100', and a plurality of fire probabilities have values between '0%' and '50%'. However, the scope of the present disclosure is not limited thereto. For example, the range of a plurality of weight values and a plurality of fire probabilities may be arbitrarily set depending on a user's setting.

Figure 6A:
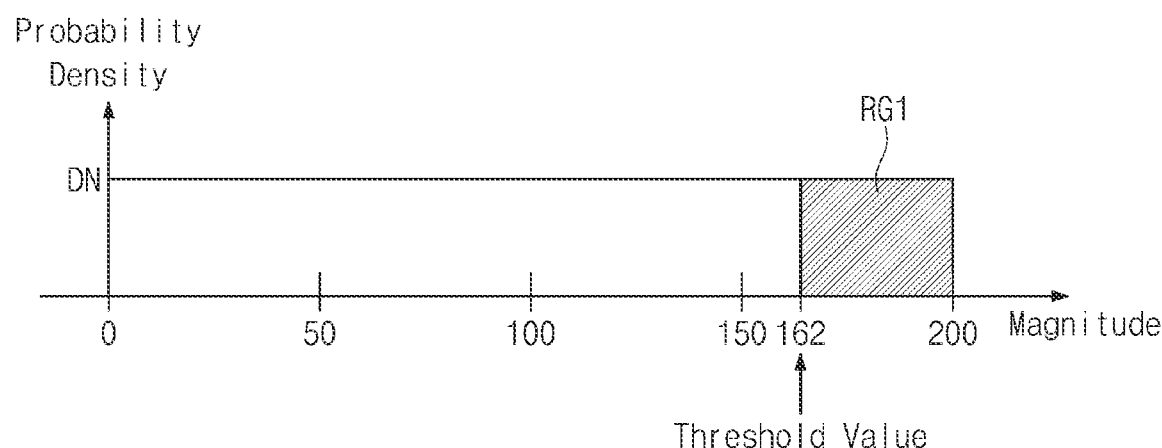
FIG. 6A is a graph illustrating an operation of converting a fire probability into a threshold value, according to an embodiment of the present disclosure.
Figure 6A:
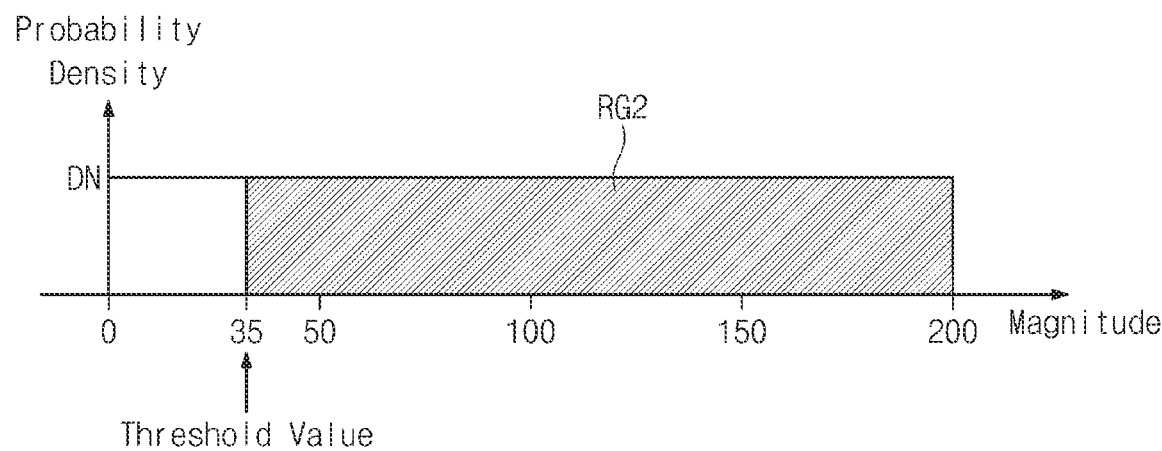

FIG. 6A is a graph illustrating an operation of converting a fire probability into a threshold value, according to an embodiment of the present disclosure. Referring to FIG. 6A, it is illustrated that probabilities that the lower limit value of the random number value is '0', the upper limit value of the random number value is '200', and each of the lower limit value, the upper limit value, and values between the lower limit value and the upper limit value is output as the random number value RN are the same as each other as reference density DN. A vertical axis represents probability density. A horizontal axis represents a magnitude of each of a threshold value and a random number value.

The conversion table may set the threshold value such that a fire probability is the same as a probability that the random number value is greater than the threshold value. For example, when the fire probability is '19%', the probability that the random number value is greater than the threshold value may be '19%'. Referring to a first case that the fire probability is '19%', a first region RG1 is shown. The first region RG1 may be a region where the random number value is greater than the threshold value. The threshold value may be determined to be '162' such that the probability that the random number value is greater than the threshold value is '19%'.

For example, when the fire probability is '82.5%', the probability that the random number value is greater than the threshold value may be '82.5%'. Referring to a second case that the fire probability is '82.5%', a second region RG2 is shown. The second region RG2 may be a region where the random number value is greater than the threshold value. The threshold value may be determined to be '35' such that the probability that the random number value is greater than the threshold value is '82.5%'. As described above, it has been described with reference to FIG. 6A that the lower limit value of the random number value is '0' and the upper limit value of the random number value is '200'. However, the scope of the present disclosure is not limited thereto. For example, the lower limit value and upper limit value of the random number value may be arbitrarily set depending on a user's setting, and thus the range of the threshold value may also be changed.

Figure 6B:
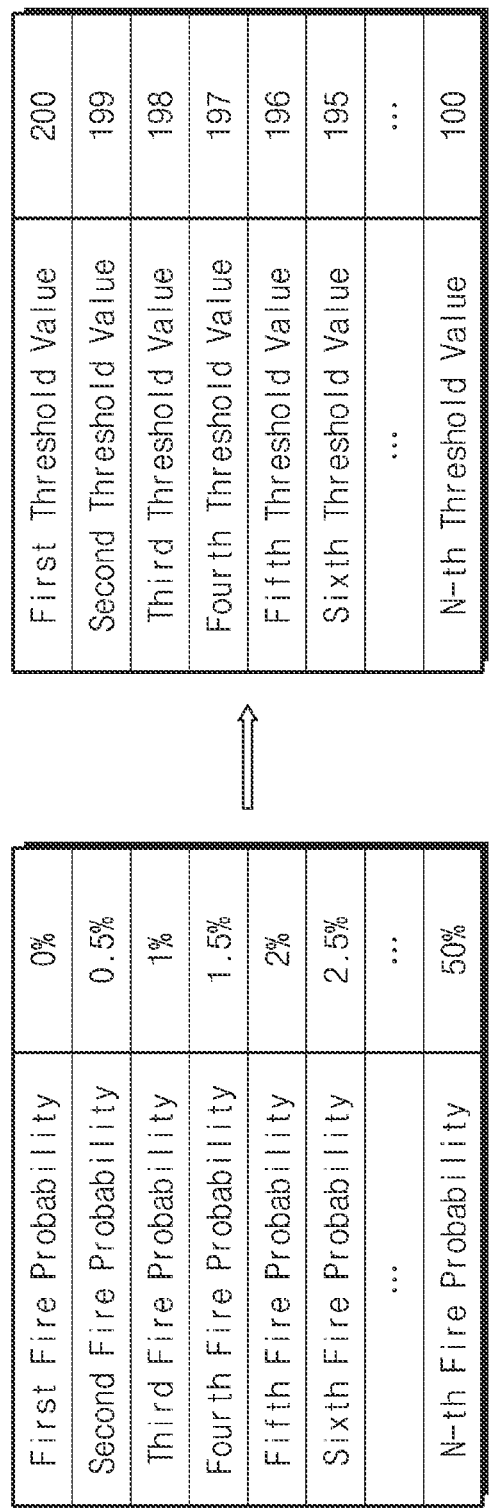
FIG. 6B is a detailed diagram of a conversion table, according to an embodiment of the present disclosure.

FIG. 6B is a detailed diagram of an operation of a conversion table, according to an embodiment of the present disclosure. Referring to FIG. 6B, the conversion table may convert first to N-th fire probabilities into first to N-th threshold values corresponding to the first to N-th fire probabilities, respectively.

As described in FIG. 6A, the conversion table may set a threshold value such that a fire probability is the same as a probability that a random number value is greater than the threshold value. For example, the lower limit value of the random number value is '0'. The upper limit value of the random number value is '200'. Probabilities that the values between the lower limit value and the upper limit value will be output as random number values are the same as each other. In this case, as shown in FIG. 6B, when a first fire probability is '0%', the probability that the random number value is greater than the first threshold value is '0%', and thus the first threshold value is '200'. When the N-th fire probability is '50%', the probability that the random number value is greater than the N-th threshold value is '50%', and thus the N-th threshold value is '100'.

Figure 7:
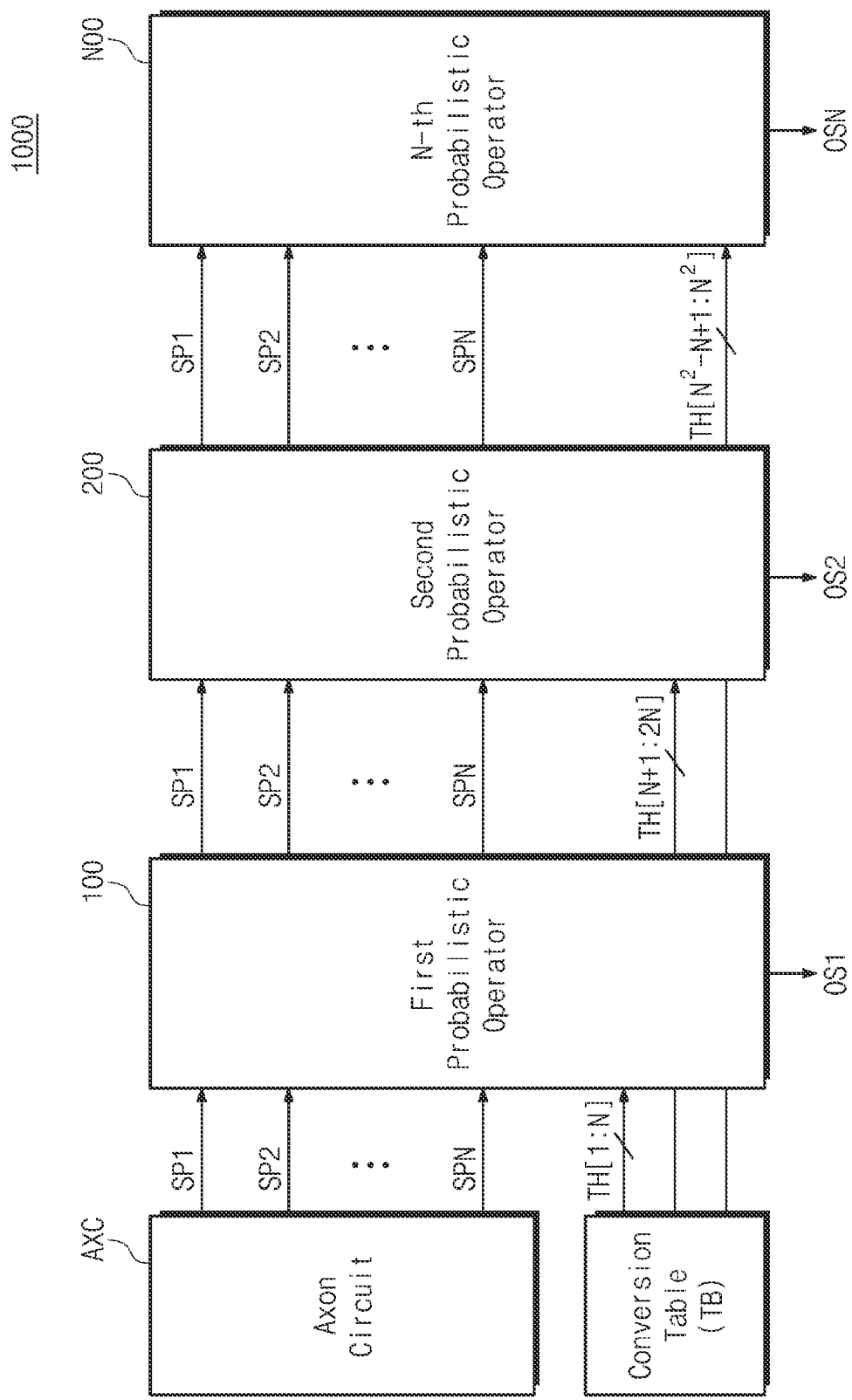
FIG. 7 is a detailed diagram of a spike neural network circuit, according to an embodiment of the present disclosure.

FIG. 7 is a detailed diagram of a spike neural network circuit, according to an embodiment of the present disclosure. Referring to FIG. 7, the spike neural network circuit 1000 may include the axon circuit AXC and first to N-th probabilistic operators 100 to N00. The axon circuit AXC, the conversion table TB, and the first the probabilistic operator 100 may correspond to the axon circuit AXC, the conversion table TB, and the probabilistic operator 100 of FIG. 3, respectively.

The axon circuit AXC may generate the first to N-th input spike signals SP1 to SPN and may transmit the first to N-th input spike signals SP1 to SPN to the first to N-th probabilistic operators 100 to N00, respectively.

The conversion table TB may output a plurality of threshold values TH[1:N] to the first the probabilistic operator 100, may output a plurality of threshold values TH[N+1:2N] to the second probabilistic operator 200, and may output a plurality of threshold values TH[$N^2$–N+1:$N^2$] to the N-th probabilistic operator N00. The conversion table TB may convert a plurality of weight values corresponding to the plurality of synapses SY11 to SYNN of FIG. 1 into a plurality of threshold values [1:$N^2$].

Each of the second to N-th probabilistic operators 200 to N00 may be implemented in the same method as the first the probabilistic operator 100. When the first to N-th input spike signals SP1 to SPN are received from the axon circuit AXC, the second probabilistic operator 200 may output an output spike signal OS2 by comparing the random number value and each of the plurality of threshold values TH[N+1:2N]. When the first to N-th input spike signals SP1 to SPN are received from the axon circuit AXC, the N-th probabilistic operator N00 may output an output spike signal OSN by comparing the random number value and each of the plurality of threshold values TH[$N^2$–N+1:$N^2$].

Figure 8:
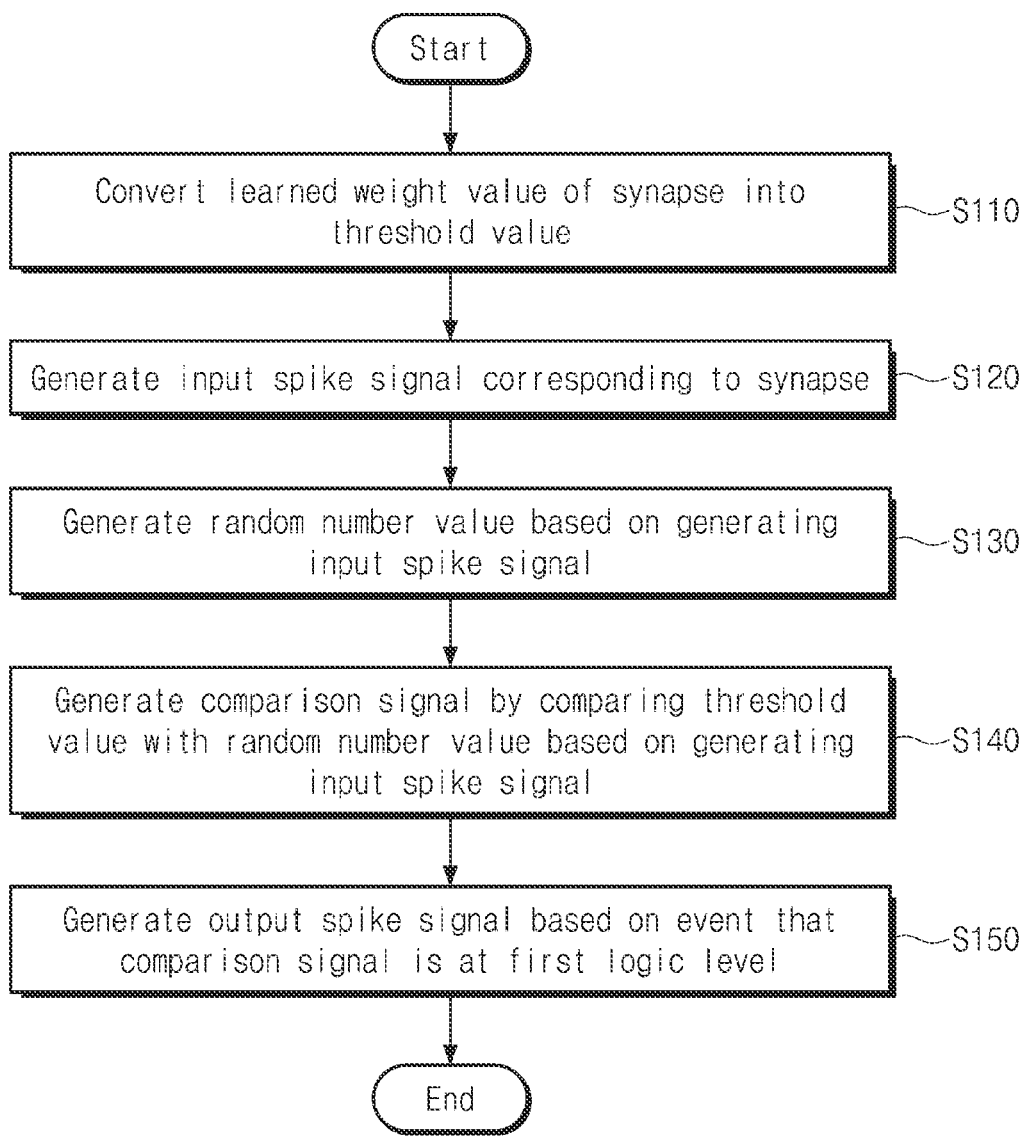
FIG. 8 is a flowchart illustrating a method of operating a spike neural network circuit, according to an embodiment of the present disclosure.

FIG. 8 is a flowchart illustrating a method of operating a spike neural network circuit, according to an embodiment of the present disclosure. Referring to FIG. 8, a method of operating the spike neural network circuit of FIG. 3 is illustrated.

In operation S110, the spike neural network circuit 10 may convert the learned weight value of a synapse into a threshold value TH1. The spike neural network circuit 10 may generate the threshold value TH1 such that a fire probability of synapse is the same as a probability that the random number value RN is greater than the threshold value TH1.

In operation S120, the spike neural network circuit 10 may generate the first input spike signal SP1 corresponding to the synapse.

In operation S130, the spike neural network circuit 10 may generate the random number value RN based on generating the first input spike signal SP1. The random number value RN may be generated between a lower limit value and an upper limit value.

In operation S140, the spike neural network circuit 10 may generate the comparison signal CP1 by comparing the threshold value TH1 with the random number value RN based on generating the first input spike signal SP1.

In operation S150, the output spike signal OS1 may be generated based on an event that the comparison signal CP1 is at a first logic level.

The above description refers to detailed embodiments for carrying out the present disclosure. Embodiments in which a design is changed simply or which are easily changed may be included in the present disclosure as well as an embodiment described above. In addition, technologies that are easily changed and implemented by using the above embodiments may be included in the present disclosure. While the present disclosure has been described with reference to embodiments thereof, it will be apparent to those of ordinary skill in the art that various changes and modifications may be made thereto without departing from the spirit and scope of the present disclosure as set forth in the following claims.

According to an embodiment of the present disclosure, a spike neural network circuit including a probabilistic operator is provided.

According to an embodiment of the present disclosure, a spike neural network circuit is provided to simplify an operation procedure and to reduce the power and operating speed required for an operation.

While the present disclosure has been described with reference to embodiments thereof, it will be apparent to those of ordinary skill in the art that various changes and modifications may be made thereto without departing from the spirit and scope of the present disclosure as set forth in the following claims.

What is claimed is:

1. A spike neural network circuit comprising:
   an axon circuit configured to:
      generate a first input spike signal; and
      generate a second input spike signal;
   a conversion table configured to:
      convert a first fire probability of a first neuron corresponding to the first input spike signal into a first threshold value; and
      convert a second fire probability of a second neuron corresponding to the second input spike signal into a second threshold value; and
   a probabilistic operator,
   wherein the probabilistic operator includes:
      a random number generator configured to generate a random number value based on an event that at least one of the first input spike signal and the second input spike signal is at a first logic level;
      a random number comparator configured to;
         generate a first comparison signal by comparing the first threshold value with the random number value; and
         generate a second comparison signal by comparing the second threshold value with the random number value; and
      a spike generator configured to generate an output spike signal corresponding to the first neuron based on an event that at least one of the first comparison signal and the second comparison signal is at the first logic level,
   wherein the first fire probability is identical to a probability that the random number value is greater than or equal to the first threshold value, and
   wherein the second fire probability is identical to a probability that the random number value is greater than or equal to the second threshold value.

2. The spike neural network circuit of claim 1, wherein the probabilistic operator further includes a spike detector configured to:
   generate a first activation signal having the first logic level when the first input spike signal is received from the axon circuit; and
   generate the first activation signal having a second logic level when the first input spike signal is not received from the axon circuit.

3. The spike neural network circuit of claim 2, wherein the random number comparator is further configured to:
   generate the first comparison signal by comparing the first threshold value with the random number value when the first activation signal is at the first logic level; and
   not generate the first comparison signal when the first activation signal is at the second logic level.

4. The spike neural network circuit of claim 2, wherein the spike detector is further configured to:
   generate a second activation signal having the first logic level when the second input spike signal is received; and generate the second activation signal having the second logic level when the second input spike signal is not received.

5. The spike neural network circuit of claim 4, further comprising:
a first logic gate configured to generate a random number generator activation signal corresponding to an OR operation of the first activation signal and the second activation signal; and
a second logic gate configured to generate a spike generator activation signal corresponding to an OR operation of the first comparison signal and the second comparison signal.

6. The spike neural network circuit of claim 5, wherein the random number generator is further configured to:
generate the random number value when the random number generator activation signal is at the first logic level,
wherein the spike generator is further configured to:
generate the output spike signal when the spike generator activation signal is at the first logic level, and
wherein the first logic level is at a logic high level.

7. The spike neural network circuit of claim 1, wherein the random number comparator is further configured to:
generate the first comparison signal having the first logic level when the random number value is greater than or equal to the first threshold value; and
generate the first comparison signal having a second logic level when the random number value is less than the first threshold value, and
wherein the first logic level is at a logic high level, and the second logic level is at a logic low level.

8. The spike neural network circuit of claim 1, wherein the conversion table is further configured to:
convert a first weight value learned for a first synapse corresponding to the first input spike signal and the first neuron into the first fire probability, and
wherein the first fire probability is a probability that the first neuron fires.

9. The spike neural network circuit of claim 1, wherein the random number generator is further configured to:
output one value of a lower limit value, an upper limit value, and values between the lower limit value and the upper limit value as the random number value, and
wherein probabilities that each of the lower limit value, the upper limit value, and the values between the lower limit value and the upper limit value is output as the random number value are the same as each other.

10. A spike neural network circuit comprising:
an axon circuit configured to generate a first input spike signal;
a conversion table configured to convert a first fire probability of a first neuron corresponding to the first input spike signal into a first threshold value and to convert a second fire probability of a second neuron corresponding to the first input spike signal into a second threshold value;
a first probabilistic operator; and
a second probabilistic operator,
wherein the first probabilistic operator includes:
a first random number generator configured to generate a first random number value based on an event that the first input spike signal is at a first logic level;
a first random number comparator configured to generate a first comparison signal by comparing the first threshold value with the first random number value; and
a first spike generator configured to generate a first output spike signal corresponding to the first neuron based on an event that the first comparison signal is at the first logic level,
wherein the second probabilistic operator includes:
a second random number generator configured to generate a second random number value based on an event that the first input spike signal is at the first logic level;
a second random number comparator configured to generate a second comparison signal by comparing the second threshold value with the second random number value; and
a second spike generator configured to generate a second output spike signal corresponding to the second neuron based on an event that the second comparison signal is at the first logic level,
wherein the first fire probability is identical to a probability that the first random number value is greater than or equal to the first threshold value, and
wherein the second fire probability is identical to a probability that the second random number value is greater than or equal to the second threshold value.

11. The spike neural network circuit of claim 10, wherein the first probabilistic operator further includes:
a first spike detector configured to:
generate a first activation signal having the first logic level when the first input spike signal is received from the axon circuit; and
generate the first activation signal having a second logic level when the first input spike signal is not received from the axon circuit, and
wherein the second probabilistic operator further includes:
a second spike detector configured to:
generate a second activation signal having the first logic level when the first input spike signal is received from the axon circuit; and
generate the second activation signal having the second logic level when the first input spike signal is not received from the axon circuit.

12. The spike neural network circuit of claim 10, wherein the first random number comparator is further configured to:
generate the first comparison signal having the first logic level when the first random number value is greater than or equal to the first threshold value; and
generate the first comparison signal having a second logic level when the first random number value is less than the first threshold value,
wherein the second random number comparator is further configured to:
generate the second comparison signal having the first logic level when the second random number value is greater than or equal to the second threshold value; and
generate the second comparison signal having the second logic level when the second random number value is less than the second threshold value, and
wherein the first logic level is at a logic high level, and the second logic level is at a logic low level.

13. The spike neural network circuit of claim 10, wherein the conversion table is further configured to:
convert a first weight value learned for a first synapse corresponding to the first input spike signal and the first neuron into the first fire probability; and convert a second weight value learned for a second synapse corresponding to the first input spike signal and the second neuron into the second fire probability,
wherein the first fire probability is a probability that the first neuron fires, and
wherein the second fire probability is a probability that the second neuron fires.

* * * * *